Aug. 3, 1937.　　　　　G. H. ZOUCK　　　　2,088,680
MEANS FOR CONTROLLING LATERAL MOTION OF A RAILWAY VEHICLE AXLE
Filed July 22, 1935　　　　6 Sheets-Sheet 3
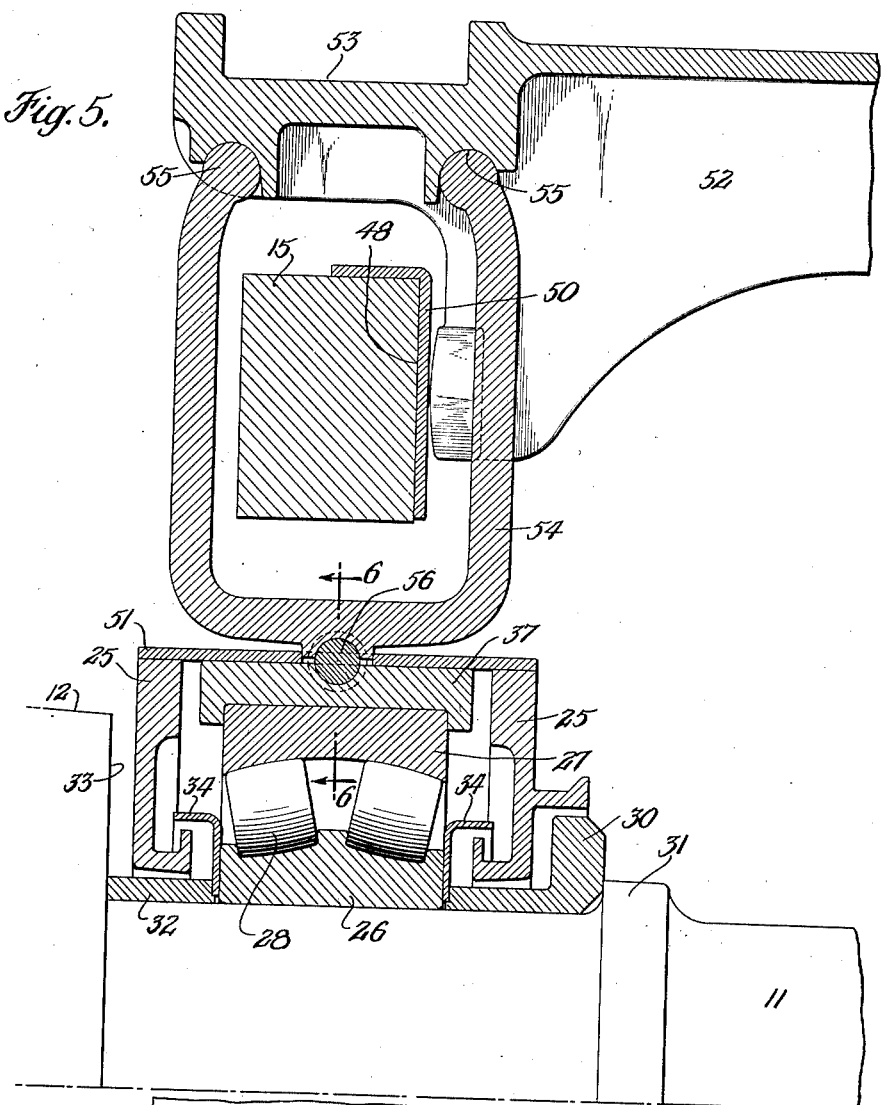
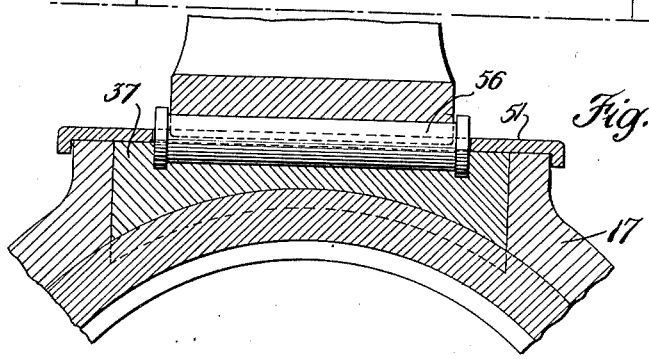
INVENTOR
George H. Zouck
BY
ATTORNEYS

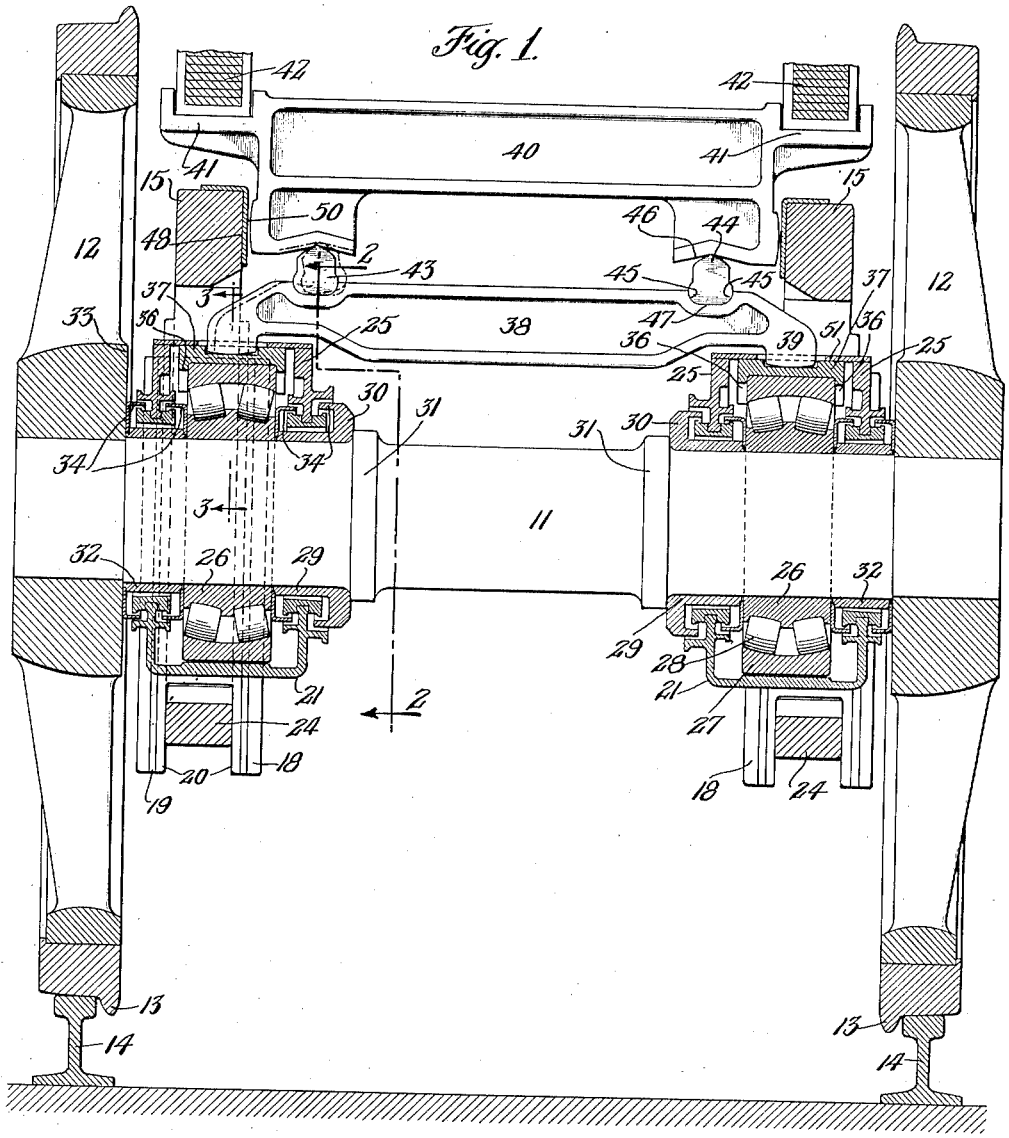
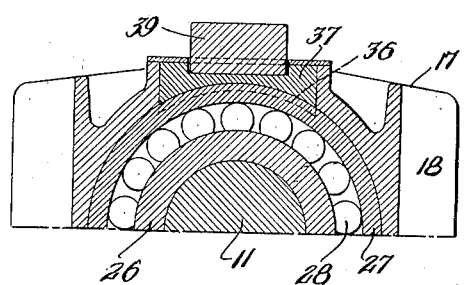

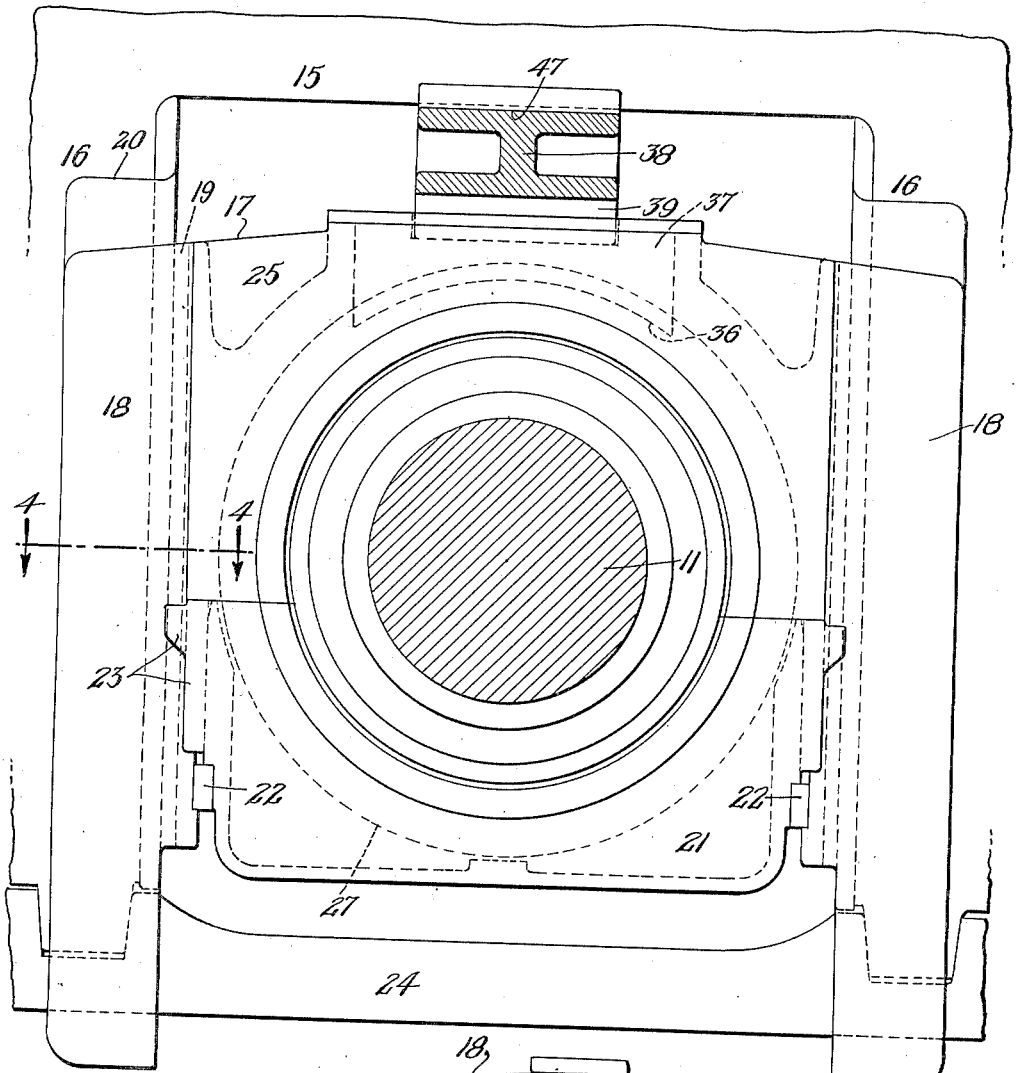
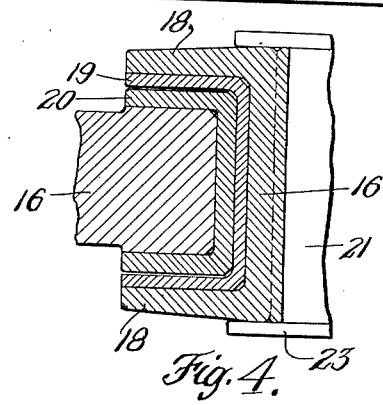
Fig. 2.
Fig. 4.

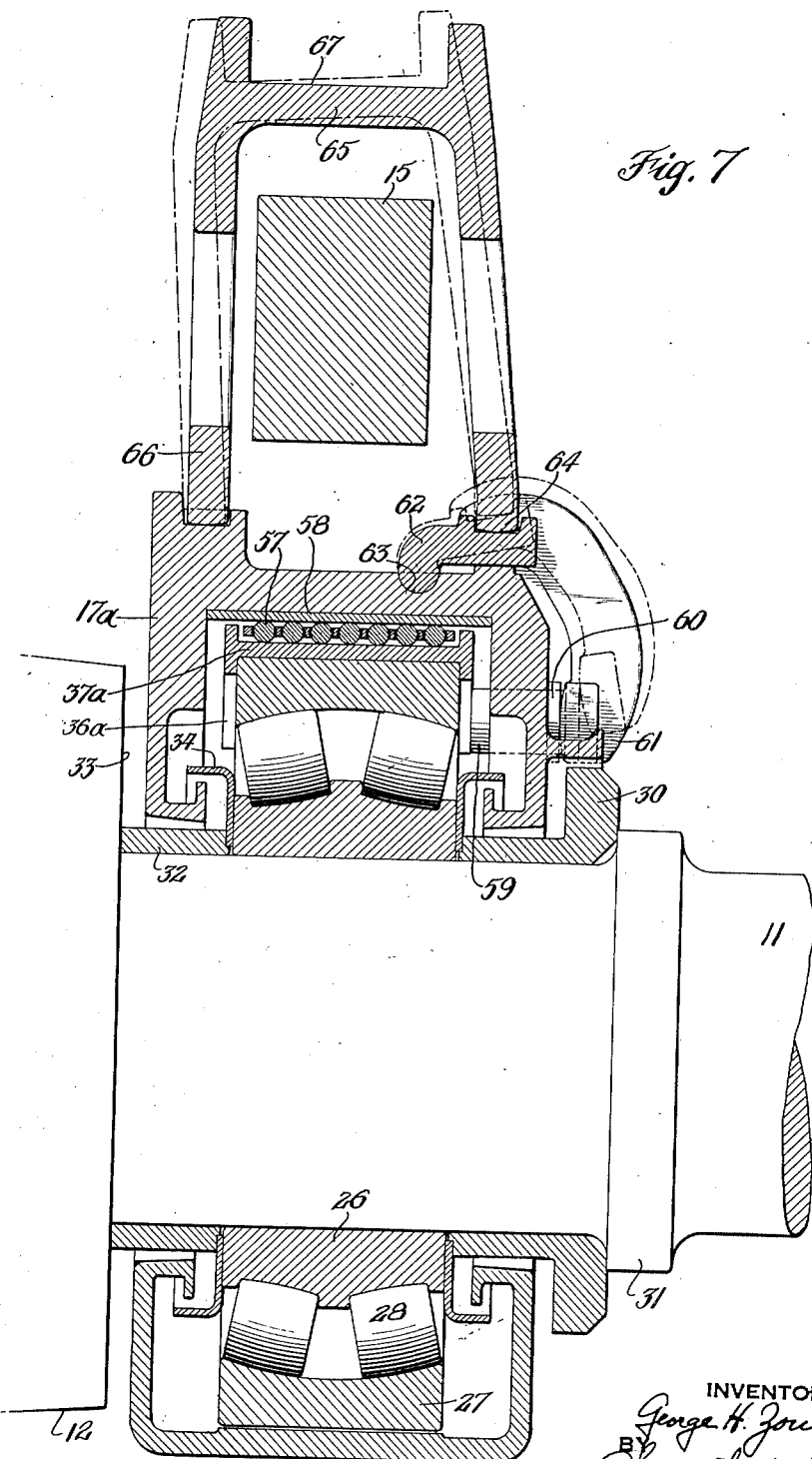

Aug. 3, 1937.  G. H. ZOUCK  2,088,680
MEANS FOR CONTROLLING LATERAL MOTION OF A RAILWAY VEHICLE AXLE
Filed July 22, 1935  6 Sheets-Sheet 5
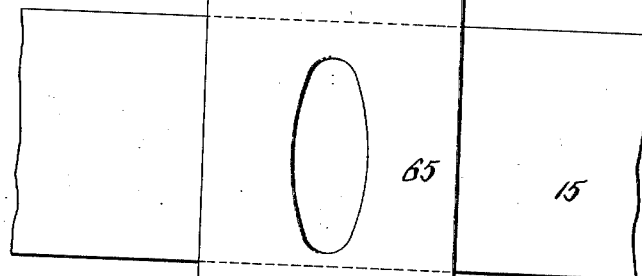
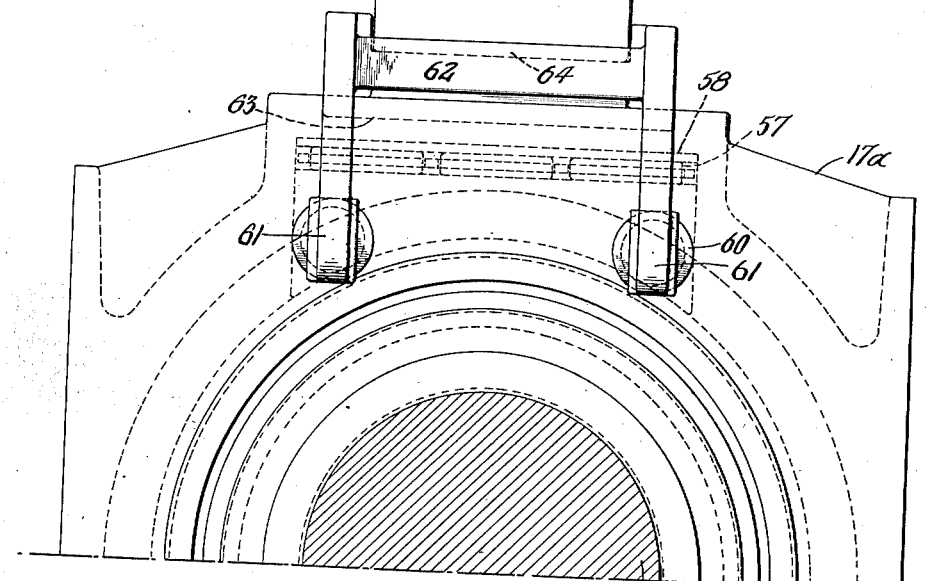
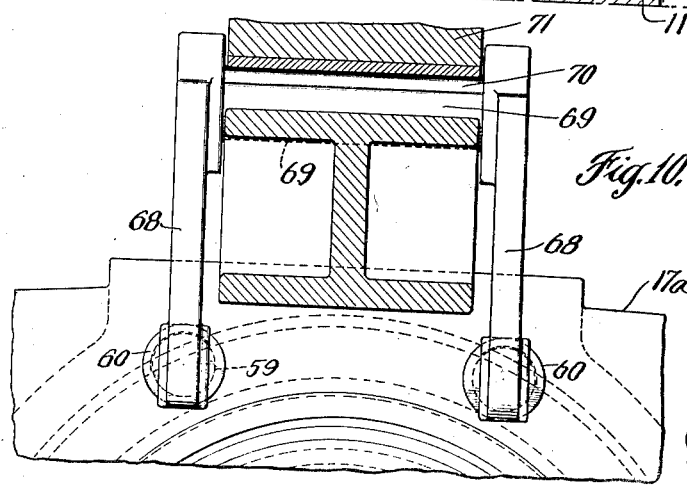

Aug. 3, 1937. G. H. ZOUCK 2,088,680
MEANS FOR CONTROLLING LATERAL MOTION OF A RAILWAY VEHICLE AXLE
Filed July 22, 1935 6 Sheets-Sheet 6

INVENTOR
George H. Zouck
ATTORNEYS

Patented Aug. 3, 1937

2,088,680

UNITED STATES PATENT OFFICE 2,088,680

MEANS FOR CONTROLLING LATERAL MOTION OF A RAILWAY VEHICLE AXLE

George H. Zouck, Orange, N. J., assignor to Franklin Railway Supply Company, New York, N. Y., a corporation of Delaware Application July 22, 1935, Serial No. 32,494

4 Claims. (Cl. 105—80)

This invention relates to railway vehicles and specifically to means for yieldingly resisting and controlling the relative movements which occur during service between a locomotive axle and the frame or other structure in which it is mounted. It is especially useful in vehicles which have long rigid wheel bases, such, for example, as are found in modern high power locomotives, but it is by no means to be limited thereto because the essential features of the invention are equally applicable to any railway vehicle.

As is well known in the art, a railway vehicle axle and particularly a driving axle on a locomotive having a long rigid wheel base must have freedom for relative lateral motion with respect to the vehicle or framework in which it is mounted and the principal object of my invention is to provide an improved means for yieldingly resisting and controlling such lateral motion. The advantages to be obtained by providing for such controlled lateral motion of a railway vehicle axle are fully set forth in my copending application Serial No. 696,693, filed November 4, 1933, to which application reference may be had if so desired. The invention of the present application is in the nature of a further development of the principles disclosed in such application.

As a primary object of the present invention I provide bearings for the axle, preferably of the roller type, which are mounted on the axle so as to move therewith during relative lateral motion between the axle and the frame of the vehicle which it is supporting, in combination with a lever system which is arranged to react between said bearing and the load so that, when relative movement occurs, load will be raised to yieldingly resist the lateral movement whereby the load acts to return the bearing and the axle to normal or neutral position after cessation of the forces which caused the lateral motion.

A further object of the invention is to provide a construction of the foregoing character in which the load is maintained central over the bearing.

Other objects and advantages will be apparent as the description proceeds.

In the accompanying drawings:

Figure 1 is a vertical section taken longitudinally of a locomotive driving axle illustrating one form of the present invention applied thereto.

Figure 2 is an enlarged section taken approximately as indicated by the line 2—2 on Figure 1.

Figure 3 is a section on the line 3—3 of Figure 1.

Figure 4 is a section on the line 4—4 of Figure 2.

Figure 5 is a partial section similar to that shown in Figure 1 but illustrating a modified form of the invention.

Figure 6 is a section on the line 6—6 of Figure 5.

Figure 7 is another partial section similar to that of Figure 1 illustrating a further modification of the invention.

Figure 8 is a side elevation of Figure 7 except that the axle is shown in section.

Figure 10 is a section on the line 10—10 of Figure 9.

Figure 9:
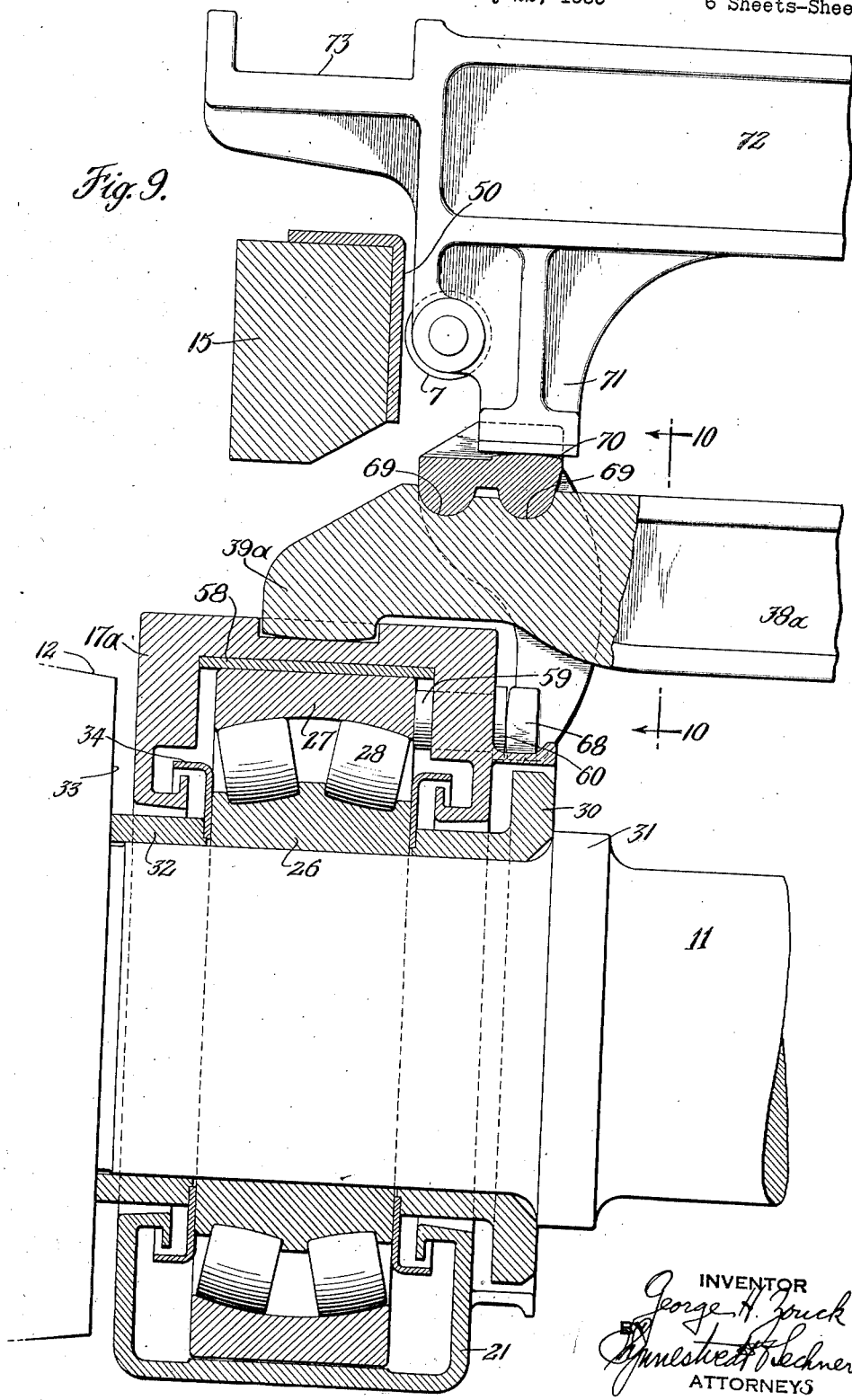
Figure 9 is another partial section similar to that shown in Figure 1 illustrating a still further modification of the present invention.

In carrying out my invention particularly as embodied in the structure shown in Figures 1 to 4 inclusive it will be seen that I have illustrated a locomotive driving axle 11 with its driving wheels 12, the latter having the usual flanges 13 for engagement with the inside of the head of the rail 14. The locomotive frame 15 at each side of the locomotive is provided with the customary pedestal jaws 16 and the axle 11 is mounted between a pair of oppositely disposed jaws. The axle boxes 17 illustrated in Figures 1 to 4 are provided with pedestal engaging flanges 18 which embrace the jaws 16 so as to permit the box to have freedom for vertical movement in the vehicle frame but so as to restrain the box against transverse movement in the frame. This is more clearly brought out in Figure 4 where it will be seen that the box flanges 18 and the adjacent face of the box itself are lined with a suitable wear plate 19 and that the faces of the pedestal jaw which come opposite thereto are fitted with a shoe 20, the arrangement, as stated, being such as to permit the box to have freedom of vertical movement in the jaws 16 but to restrain it as against movement longitudinally of the axle or transversely of the vehicle.

The bottom of the box is in the form of a cellar 21 which can be dropped away from the axle upon removal of the wedges 22, the cellar being provided with flanges 23 which lap over the flanges 18, the latter extending down from the top portion of the box in position to embrace the cellar 21 as clearly shown in the drawings. The opening at the bottom of the pedestal jaws 16 may be closed in the customary manner by means of the pedestal binder 24.

The top of the box between its vertical side walls 25 and its opposed pedestal engaging flanges 18 is open as shown most clearly in Figures 1 and 3, so that the load can be transmitted to the axle by means of the structure now to be described.

Upon each end of the axle and within its respective box is mounted a roller bearing preferably of the type known as the self-aligning type, although the invention is not to be limited to this particular type of roller bearing. I prefer this type because of the fact that up and down rocking movements of the axle are taken care of by virtue of the rounded or barrel formation of the rollers and the corresponding curvature of the outer race of a roller bearing of this nature.

The bearings include an inner race 26 which may be shrunk upon the axle in order to rotate and move therewith and an outer race 27 between which are two rings of barrel-shape rollers 28, with the rollers of the two rings inclined in opposite directions as shown in the drawings and as typical of roller bearings of this type. A spacing ring or collar 29 having a laterally extending protecting shoulder 30 is fitted between the axle shoulder 31 and the inner face of the inner race 26 and another spacing ring 32 is fitted between the hub face 33 of the wheel and the outer face of the inner race 26. Oil retaining rings 34 are provided in a manner and for a purpose well understood in this art.

At the top the outer race is embraced by the flanges 36 of a suitable backing member 37. This backing member may be extended downwardly around the outer race 27 to a distance greater than that shown if so desired, in some instances in fact being constructed as an annular housing for the roller bearing similar to that which is described, for example, in the copending application of Harold E. Brunner, Serial No. 716,979, filed March 23, 1934. In the present arrangement, however, the backing member 37 is of a size which will fit conveniently within the open top of the box 17 as shown to best advantage in Figure 3, the box itself resting directly upon the outer race 27.

It will be clear from the description so far that the bearing with its backing member is mounted within the box so as to move with the axle laterally of the vehicle, the box itself being so arranged as to be restrained against such lateral movement.

The load is transmitted to the bearing on the axle by means of a lever system which includes the cross member 38 having one leg 39 resting on the top of each backing member 37 in a suitable pocket or depression in the latter, the cross member 40 having at each end an arm 41 for receiving the load of the vehicle through the customary springs 42 and the intermediate rocker members 43, one at each end of the cross members. At the top the rockers are of an inverted V-shape 44 and at the bottom they are provided with oppositely disposed rounded portions 45, the V-shaped portions 44 at the top projecting into and cooperating with correspondingly shaped seats 46 and the rounded portions 45 at the bottom fitting into a correspondingly shaped cup 47 on the top of the cross member 38, all as will be clearly seen upon inspection of Figure 1.

During relative lateral motion between the axle 11 and the vehicle frame 15 the lever system just described will operate to raise the load or at least a portion of the load, so that when the forces which gave rise to the displacement terminate the load will act to return the axle to normal or neutral position. The rocking action which takes place insofar as the rockers 43 are concerned, is indicated in dotted lines at the left of Figure 1, from an inspection of which it will be seen that as the axle moves to the right relatively to the frame 15 the cross member 33 will move to the right, the bottom of the rocker 43 will move to the right and the cross member 40 will be lifted slightly against the load which is being transmitted through the spring 42.

A bearing point for the lever system is provided against the frame 15 and in the construction of Figures 1 to 4 this is located generally at 48, there being provided a suitable wear plate 50.

The open top of the boxes 17 may be closed by a suitable cover plate 51 which is provided with an opening of sufficient size to permit of the necessary movement of the legs 39 of the cross member 38.

With the arrangement of Figures 1 to 4 inclusive, as lateral motion takes place it will be obvious that the load is maintained central of the bearing which is a preferred construction inasmuch as it more evenly distributes the stresses involved.

In Figures 5 and 6 the lever system takes a somewhat different form, although the balance of the structure is the same as that which is illustrated in Figures 1 to 4. In these two figures there is an upper cross member 52 provided with suitable recesses 53 for receiving the load through the medium of the vehicle springs as before. A similar bearing point 48 on the frame 15 and wear strip 50 are provided in this arrangement, but instead of the bottom cross member 38 and the rockers 43 of Figures 1 and 4 there is provided in Figures 5 and 6 a U-shaped rocking member 54 the bottom of which rests upon the backing member 37 and the two legs of which are extended upwardly on either side of the frame 15 to terminate in the rounded portions 55 adapted to seat in correspondingly formed sockets in the member 52 directly under the spring pocket 53. I prefer to employ a suitable roller or pin 56 between the bottom of the rocker member and the top of the backing member.

The operation of this arrangement will be obvious, but it might be stated that upon relative lateral movement between the axle 11 and the frame 15 the load will be raised upon one or the other of the arms of the U-shaped rocker, the load again serving as before, upon such displacement to return the axle to normal or neutral position upon cessation of the forces which gave rise to the lateral motion.

In Figures 5 and 6 as in Figures 1 to 4, the load is maintained centrally of the bearing during lateral motion by virtue of the fact that the box is provided with an open top and the load is passed directly to the backing member 37.

In the modification shown in Figures 7 and 8 a slightly different arrangement is illustrated. Here the box 17a is closed at the top instead of open and between the backing member 37a and the under face of the top of the box is provided a series of rollers 57 for the purpose of reducing the friction when lateral motion occurs. A wear strip 58 may be employed if desired between the backing member 37a and the under face of the top of the box.

At the inside of the box and at each side of the backing member 37a is provided a plunger 59 which extends inwardly through a suitable opening in the wall of the box. The head 60 of each plunger is adapted to bear against the adjacent arm 61 of a U-shaped rocker member which extends upwardly around the top of the box and is provided with an extension or arm 62 terminating in the rounded portion 63 which bears on top of the box. The portion 62 has on its upper face a suitable pocket in which rests one leg 64 of the spring saddle 65. The other leg 66 of the spring saddle comes down on the opposite side of the frame 15 and rests in a suitable pocket in the top of the box 17a. The spring, not shown, is adapted to fit into the spring pocket 67 on top of the saddle.

When relative lateral motion occurs between the axle 11 and the frame 15 the rocker and the spring saddle are moved to the positions indicated in dot and dash lines, which, of course, will serve to raise the load to yieldingly resist such lateral motion. In this arrangement the leverage system does not include any cross members, but it will be obvious, of course, that they are not necessary. Lateral motion of the axle will move the roller bearing in the same manner as before in connection with the structure of the other figures, and such lateral motion will be transmitted through the flanges 36a of the backing member 37a to the plungers 59 which, in turn, as already described, will force the arm 61 of the rocker to the dot and dash position shown in Figure 7.

In Figures 9 and 10 another modification is illustrated involving the use of a box 17a which does not have an open top but in which the roller bearing is adapted to move with the axle, the box in this figure as well as in all of the other figures being restrained as against lateral movement, although free to have vertical or up and down movement in the pedestal jaws. In the arrangement of Figures 9 and 10 the antifriction rollers 57 are dispensed with and the outer race 27 of the roller bearing is shown as bearing directly against the wear plate 58. This arrangement is quite possible although not the preferred arrangement, it being necessary, of course, to provide some means for adequately lubricating the sliding surfaces between the race 27 and the wear plate 58.

As in the case of Figures 7 and 8 the structure of Figures 9 and 10 employs the plungers 59, the heads 60 of which are adapted to abut against the arms 68 of a rocker member which has a pair of spaced rounded bearings 69 resting in suitable pockets on the upper face of the cross member 38a, which latter member is essentially the same as the cross member 38 shown in Figures 1 to 4. The legs 39a of this cross member, however, do not rest directly upon the bearing or its backing member as in the case of Figures 1 to 4, but are adapted to rest in a suitable pocket in the top of the closed box 17a.

Above the inner rounded portion 69 is provided a suitably curved seat 70 upon which rests the downward extension 71 of the upper cross member 72, the latter having a spring pocket 73 for receiving the load of the vehicle. At the bearing point between the frame 15 and the cross member 72 I provide a roller 73 which is adapted to abut against the wear plate 50.

The operation of this device will be obvious from the foregoing, but it might be stated that upon relative movement between the axle 11 and the frame 15 motion of the bearing will be transmitted to the plunger 59 and from the plunger to the arm 68 of the roller which will raise the arm 70 to lift the cross member 72 against the load which it receives through the medium of the spring resting in the box 73. In this way again the load will be employed to yieldingly resist the lateral motion and return the axle to normal position upon cessation of the forces which gave rise to the lateral motion.

Attention is directed to the fact that in the arrangements shown in Figures 7 to 10 inclusive the load is not maintained central over the bearing during lateral motion and I do not prefer this arrangement, although it is quite possible to make use of the invention in structures of this kind, and in the appended claims which are not otherwise limited it is the intention to include structures of this nature.

In all of the arrangements illustrated and described it will be seen that I have provided a lever system which reacts between the bearing and the load, which system has one arm adapted to be moved by the bearing and another arm which raises the load or at least a portion thereof upon relative movement between the axle and the frame whereby the load acts to yieldingly resist the lateral motion as well as to return the bearing and the axle to normal position after cessation of the forces which caused the lateral motion.

I claim:

1. Means for controlling relative lateral motion between a railway vehicle frame and an axle with its wheels, comprising in combination an axle box mounted in the frame so as to have freedom for vertical movement but restrained against transverse movement with respect thereto, an axle bearing in said box mounted to move laterally within the box with the axle, and means for transmitting the load to said box, said load transmitting means including a lever system having an arm which moves with the bearing and the axle, and an arm which raises load upon relative lateral movement between the frame and the axle, said lever system bearing upon the frame during relative lateral movement between the frame and the axle.

2. Means for controlling relative lateral motion between a railway vehicle frame and an axle with its wheels, comprising in combination an axle box mounted in the frame so as to have freedom for vertical movement but restrained against transverse movement with respect thereto, an axle bearing in said box mounted to move laterally within the box with the axle, and means for transmitting the load to said box, said load transmitting means including a lever system having an arm adapted to be moved by the bearing and an arm adapted to raise load upon relative lateral movement between the frame and the axle, together with plunger means extending through a wall of the box in position to transmit movement of the bearing to the lever system as described.

3. Means for controlling relative lateral motion between a railway vehicle frame and an axle with its wheels, comprising in combination an axle box mounted in the frame so as to have freedom for vertical movement but restrained against transverse movement with respect thereto, an axle bearing in said box mounted to move laterally within the box with the axle, and load transmitting means including a rocking device which is adapted to raise load upon relative lateral movement between the frame and the axle, whereby the load acts to return the bearing and the axle to normal position after cessation of the forces which caused the lateral motion.

4. Means for controlling relative lateral motion between a railway vehicle frame and an axle with its wheels, comprising in combination an open topped axle box mounted in the frame so as to have freedom for vertical movement but restrained against transverse movement with respect thereto, an axle bearing in said box mounted to move laterally within the box with the axle, and means for transmitting load through said open top to said bearing, said load transmitting means including a rocking device which is adapted to raise load upon relative lateral movement between the frame and the axle whereby the load acts to return the bearing and the axle to normal position after cessation of the forces which caused the lateral motion.

GEORGE H. ZOUCK.